United States Patent [19]
Tsutsumi

[11] 4,094,208
[45] June 13, 1978

[54] TOGGLE MEANS

[76] Inventor: Shigeru Tsutsumi, No. 1165, Toyama-cho, Yonezawa-shi, Yamagata-ken, Japan

[21] Appl. No.: 638,250

[22] Filed: Dec. 8, 1975

[30] Foreign Application Priority Data

Dec. 12, 1974 Japan .............................. 49-142018

[51] Int. Cl.² ............................................ G05G 1/04
[52] U.S. Cl. ...................................... 74/520; 403/319
[58] Field of Search .............. 74/520; 425/DIG. 222; 403/319

[56] References Cited

U.S. PATENT DOCUMENTS

| 2,186,030 | 1/1940 | Lester | 74/520 |
| 2,694,935 | 11/1954 | Roehri | 74/520 |
| 2,713,797 | 7/1955 | Roehri | 74/520 |
| 3,825,360 | 7/1974 | Galich | 403/319 |

Primary Examiner—Benjamin W. Wyche
Assistant Examiner—R. C. Turner
Attorney, Agent, or Firm—Frank J. Jordan

[57] ABSTRACT

The present invention relates to a novel toggle means which is used for the mold locking and opening of injection molding machine or for the like.

6 Claims, 21 Drawing Figures

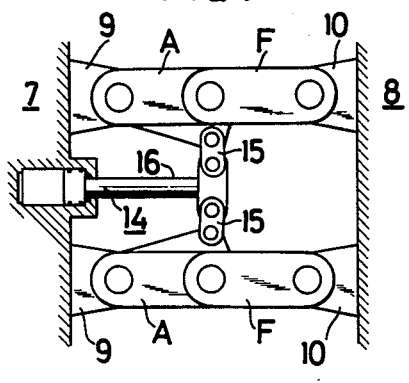
FIG.1
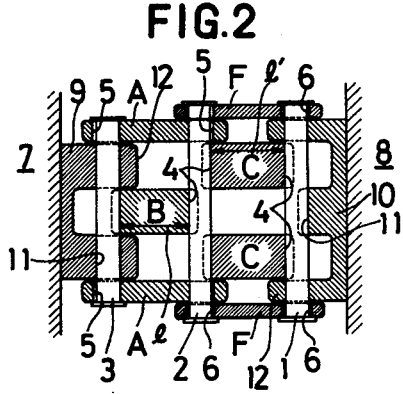
FIG.2
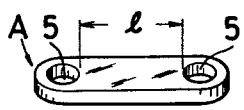
FIG.3a
FIG.3b
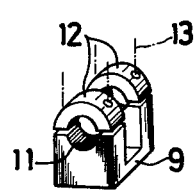
FIG.6a
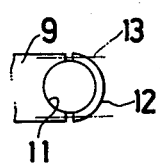
FIG.6b
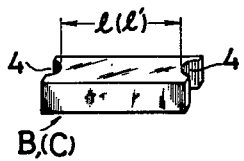
FIG.4a
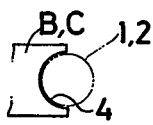
FIG.4b
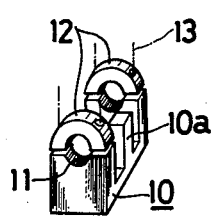
FIG.7a
FIG.7b
FIG.7c
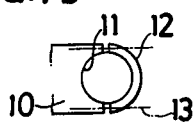
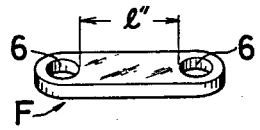
FIG.5a
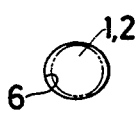
FIG.5b

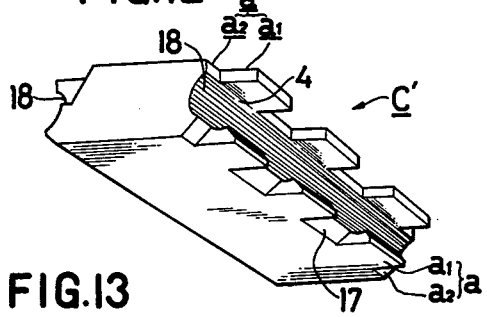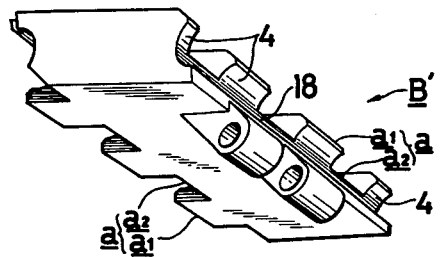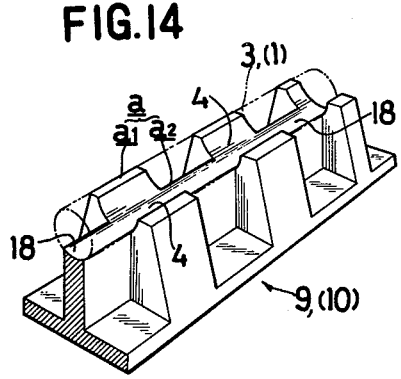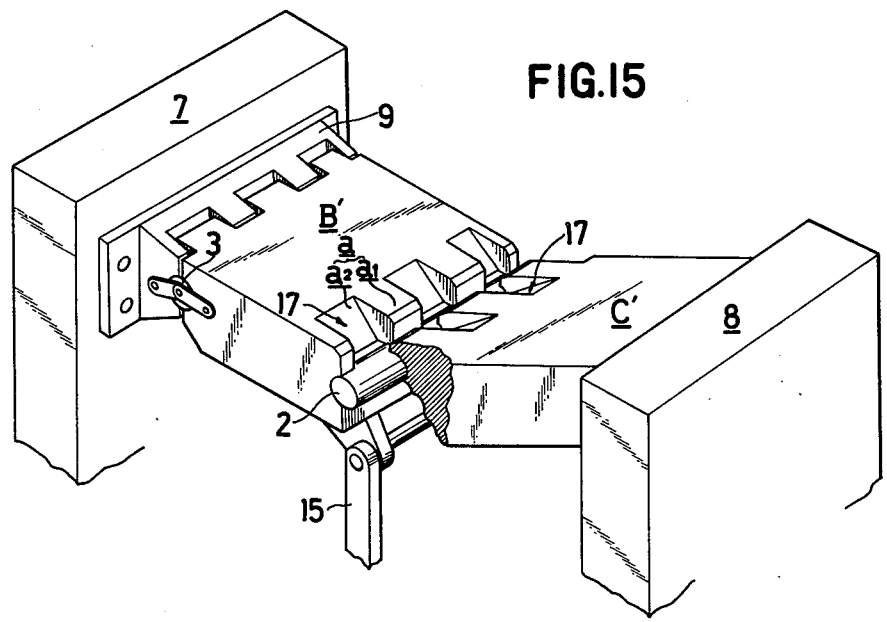

1

TOGGLE MEANS

BACKGROUND OF THE INVENTION

In this kind of toggle means according to the conventional art, a plurality of links are each previously linked with a plurality of shafts, and the links can be expanded by the pressure of a hydraulic means and the like. Thus, a preferable comressive force can be obtained. According to this kind of the toggle means an opening of the link is contacted under the high tension with the shaft to be passed through in the opening thereof. In other words, the shaft must be inserted tightly in the opening of the link, that is to say, the peripheral surface of the shaft must be contacted very exactly and tightly with the internal surface of the opening. In case the maximum pressure is applied to the toggle means by the expansion of a plurality of links, the opening of the link is contacted under the high tension with the shaft. Consequently, there is growing the danger that the opening of the link may be worn out or broken by high compression. What is the more important is that it is impossible to supply lubricating oil effectively in the opening of the link due to very tight contacting the shaft with the opening of the link. As a result, due to the shortage of lubricating oil, the opening of the link is collided tensely with the shaft, and subsequently the link or the shaft may be broken. In order to overcome such an disadvantage of the conventional art, the present invention has been achieved.

SUMMARY OF THE INVENTION

The object of the present invention is to provide a novel toggle means which is operated in combining a plurality of links for compression capable of expanding the toggle means under the high pressure with a plurality of links for pulling capable of releasing the toggle means by withdrawing the pressure.

According to one aspect of the present invention, both side ends of the link for compression are of semicircle concave shape so that they can be contacted slidably with the shafts. In parallel with the links for compression there are provided the links for pulling, each of which has at its both sides two openings. The diameter of the opening is slightly longer than the bore of the shaft. Owing to the slightly longer diameter of the opening of the link for pulling, it becomes easy to supply lubricating oil in the contacting portion between the links for compression and the shafts. At the same time, assembling of the links and shafts is easy because of such a structure that each part is separated from the other part. Consequently, change of the parts or troubleshooting is also easy.

BRIEF DESCRIPTION OF THE DRAWINGS

FIG. 1 is a side view of the first embodiment of the toggle means according to the present invention.

FIG. 2 is a transverse sectional plan view of the first embodiment in FIG. 1.

FIG. 3a is a perspective view of a link for pulling according to the first embodiment and FIG. 3b is a plan view of an opening having a longer diameter which is provided in the link for pulling.

FIG. 4a is a perspective view of a link for compression according to the first embodiment and FIG. 4b is a plan view of a semicircle concave portion provided at the side end of the link for compression.

FIG. 5a is a perspective view of another link for pulling according to the first embodiment and FIG. 5b is a plan view of an opening having a horizontally longer diameter which is provided in the link for pulling.

FIG. 6a is a perspective view of a fixed support according to the first embodiment and FIG. 6b is a plan view of one side end of the fixed support.

FIG. 7a is a perspective view of a movable support according to the first embodiment and FIGS. 7b and 7c are each plan views of the side ends of the movable support.

FIGS. 12 and 13 are each perspective views of two plate-type links for compression according to the second embodiment.

FIG. 14 is a partially cutaway perspective view of a support according to the second embodiment.

FIG. 15 is a general perspective view of the sencond embodiment.

DETAILED DESCRIPTION OF THE INVENTION

Figure 8:
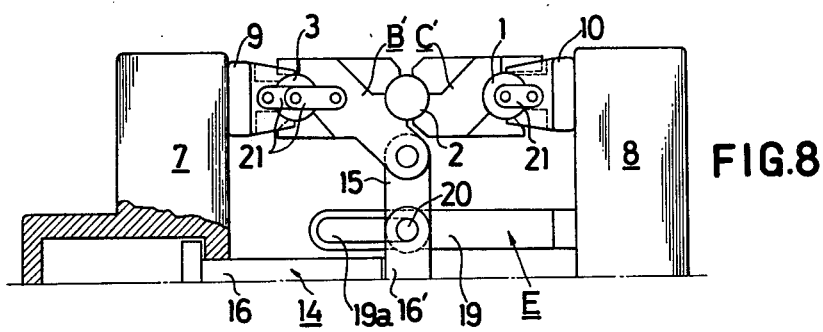
FIGS. 8 to 11 are each side views of the second embodiment showing the process from the expansion of the toggle means to its release.

The first embodiment of the toggle means according to the present invention will be described.

Links for pulling are denoted as letters A and F respectively, while links for comression are denoted as letters B and C respectively. Each of the links B and C for comression which can be expanded or turned freely between three cylindric shafts 1, 2 and 3 forms at its both side ends two semicircle concave portions 4. Thus, the semicircle concave portions 4, 4 of the links B and C for compression can be contacted slidably with a peripheral surface of the shaft 1, 2 and 3.

The links A and F for pulling which is provided in parallel with the links B and C for compression form two openings 5 and 6 respectively in which the shafts 1, 2 and 3 are inserted. And the horizontal diameter of the opening 5 of the link A for pulling is slightly longer than the bore of the cylindric shaft 2 or 3. (Refer to FIG. 3b.) Further, the length between the two openings 5 and 5 of the link A is just the same as that of the link B.

The horizontal diameter of the opening of the link F for pulling is slightly longer than the bore of the cylindric shaft 1 or 2, forming a diameter extending in opposite directions. (Refer to FIG. 5b.) And the length l'' of the link F or the distance between the two openings 6 and 6 is slightly shorter than the length l' between the shafts 1 and 2. The shafts 3 and 1 are contacted with fork-type supports 9 and 10 respectively. While the support 9 is fixed with a fixed plate 7, the support 10 is fixed with a movable plate 8. In order to mount the shafts 3 and 1 on the semicircle portions of the supports 9 and 10, two semicircle covers are provided as shown in FIGS. 6a and 7a. After the shafts 3 and 1 are inserted between the supports 9, 10 and the corresponding two covers 12, the covers 12 are screwed by bolts.

In case the support 10 has three portions 11 for receiving the shaft 1, the receiving portion 11 of a middle support 10a can be kept open with no cover.

Numeral 14 denotes a hydraulic means having small links 15 and a piston rod 16.

When a maximum pressure is applied to the toggle means comprising the links A, B, C and F by the actuation of the hydraulic means 14 (as shown in FIGS. 1 and 2), both semicircle sides of the shaft 2 and each semicircle surface of the shafts 1 and 3 are comressed in the semicircle concave portions 4 of the links B and C. On the other hand, another semicircle surface of the shafts 1 and 3 is comressed in the semicircle portion 11 of the supports 9 and 10 respectively.

When the toggle means is released by the withdrawal of the piston rod 16, the links A and F for pulling are folded owing to the openings 5 and 6 having slightly longer diameter than the bore of the shafts 1, 2 and 3 respectively. In other words, the links B and C are turned or folded between the shafts 1, 2 and 3. Further, it is available to supply easy a high viscosity lubricating oil to the slidably contacting portion between the links B, C and the shafts 1, 2 and 3.

The aforegoing operation will be shown in the following table. This table includes the condition of lubrication and shafts.

| Kind of link | Movement of link | | | Method of lubrication | Assembling |
|---|---|---|---|---|---|
| | Mold locking power (compression) | Mold opening power (pulling) | Lubrication | | |
| A | ○ | ○ | ○ | During the mold opening: To lubricate oil in the internal gap formed in the opening of the link A. During the mold locking: To lubricate oil in the external gap formed in the opening of the link A | Easy to disassemble |
| B | ○ | | ○ | During the mold opening: To lubricate oil in the internal gap of the link B | No need of taking out the shafts |
| C | ○ | | ○ | Same as the above | Same as the above |
| Supports 9 | ○ | ○ | | | If taking the cover, easy to take out the shaft |
| 10 | ○ | ○ | | | Same as the above |
| 10a | ○ | | | | |
| F | | ○ | ○ | During the mold locking: To lubricate oil in the external gap formed in the opening of the link | Easy to disassemble |

In the aforementioned first embodiment the toggle means consists of a plurality of links for compression and a plurality of links for pulling. And the links for compression are actuated only under the highly pressurized state of the toggle means. Under such a structure relationship of pressure between the shafts and the openings of the links is quite different in accordance with the mold locking and opening respectively. Owing to the slightly longer opening of the links for pulling than the bore of the shaft, it is easy to supply lubricating oil in that opening, and thereby the toggle means can be actuated smoothly. The other advantage of the first embodiment is that troubleshooting of the links and shafts or change of parts can be carried out easy. In spite of such advantages of the first embodiment, shearing force of the links toward the shafts is unavoidable, so that it is problematic to obtain a maximum compressive force.

The object of the second embodiment which will be described hereinafter is to provide a toggle means which is capable of reducing such a shearing force of the links toward the shafts and obtaining an effective compression. Therefore, the bore of the shaft can be shortened, and the toggle means can be actuated more functionable.

According to another aspect of the second embodiment, the two side ends of each plate-type link for compression are of rack shape so that a uniform compression of the link can be applied to the shaft, that is, shearing force of the link toward the shaft can be avoided.

Speaking about the feature of the second embodiment more in detail, at the position where two plate-type links for compression are facing to each other there are provided a plurality of projecting portions forming a plurality of semicircle concave portions with a certain distance, and a plurality of shorter semicircle concave portions which are also provided with a certain distance. Thus, the end of each link for compression is of rack shape, and thereby shearing force of the link toward the shaft can be reduced greatly.

With reference to the drawings the structure of the second embodiment will be first described hereinafter. The same numbering as adopted in the first embodiment will be used in regard to the following description. It should be first noted that the structure of the links B' and C' according to the second embodiment is different from that of the links B and C according to the first embodiment. The links B' and C' for compression are connected with the supports 9 and 10 by way of the shafts 2, 3 and 1. And the link B' is connected with link C' by way of the shaft 2. Both side ends to each link B' and C' are of rack shape $a$ so that they can be engaged with each other as well as with the supports 9 and 10. In addition to this, at the end of each link B' and C' there is formed a semicircle concave portion 4, 18 in a longitudinal direction. Letter $a_1$ denotes a projecting portion, while $a_2$ denotes the place where a sloping portion 17 is formed. The semicircle concave portion 4 is formed at $a_1$, while the smaller semicircle concave portion 18 is formed at $a_2$. Under such a structure the shaft 2 is inserted in the concave portion 4, 18 which is formed between the end of the link B' and the end of the link C'. The shape of the support 9, 10 is shown in FIG. 14.

The link E for pulling will be described hereinafter. An arm 16' of a rod 16 of the hydraulic means 14 is corresponding to a horizontally extending opening 19a of the pulling rod 19 linked with a small link 15. The pulling rod 19 is fixed with the movable plate 8. Numeral 21 denotes a small plate for supporting the shafts 1 and 3. It is linked with the link B' for compression. In FIG. 8 two plates of the same kind are provided particularly in order to support linkage between the shaft 3 and the support 9 as well as between the shaft 3 and the link B'. This arrangement is provided to maintain a tight linkage between the shaft and the corresponding part particularly at the time when the toggle means is released completely.

Figure 11:
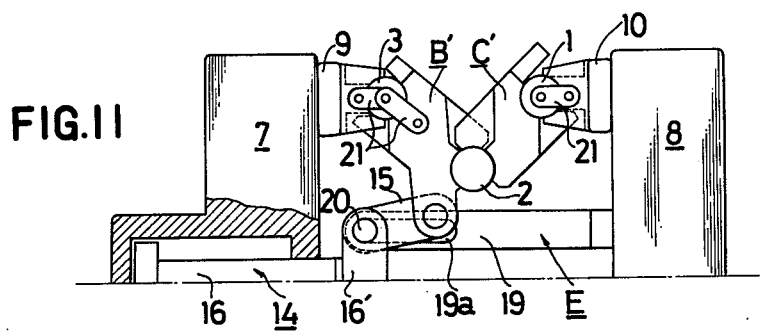

In the operational function of the second embodiment will be described in connection with the drawing. First a hydraulic means will be started as shown in FIG. 11. During the time when the arm 16' is pressing the small link 15 due to the extension of the rod 16, the link B' is forced to be raised. By way of the shaft 2 the link C' is also raised. Accordingly, the movable plate 8 is moved on a right hand, and then the mold locking is carried out.

It should be noted that the working pressure of the hydraulic piston means 14 does not affect the pulling rod E due to the opening 19a having a horizontally longer diameter which is formed at the extension rod 19, but affects exclusively both the links B' and C' for compression. This condition is shown in FIG. 8. That is, under this condition the maximum compression is obtained, and thereby a mold locking is actuated.

As mentioned above, both side ends of the links C' and B' for compression and one end side of the support 9 and 10 form a rack shape $a$. Since a compressive force is actuated throughout the semicircle concave portion 4 at $a_1$ and the shorter semicircle concave portion 18 at $a_2$, the shearing force of the links C' and B' toward the shafts can be reduced greatly. Only a slight pressure is applied at those semicircle concave portion 4 and 18.

In addition, the compressive force which is working by way of the shafts 1, 2 and 3 is dispersed by contacting with the supports 10.

Figure 9:
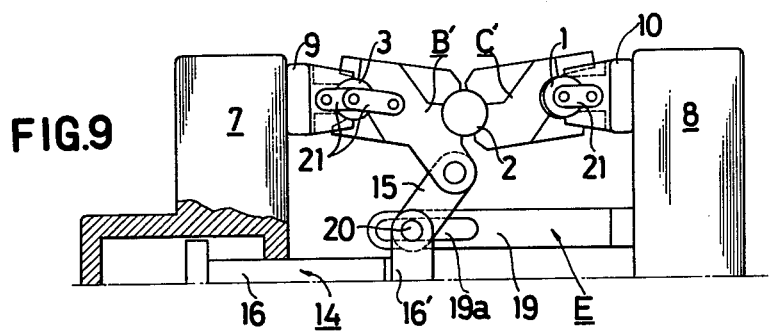
Figure 10:
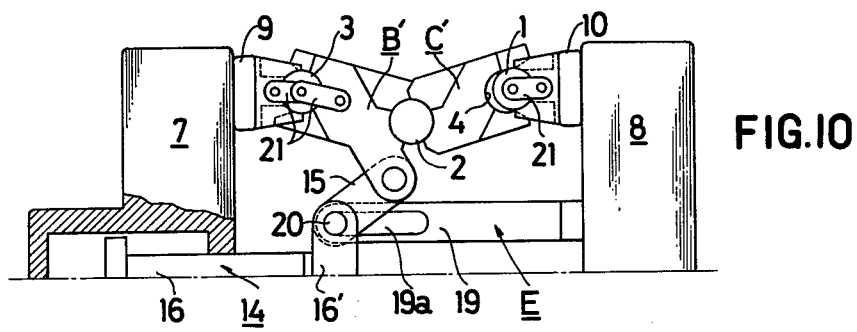

When the hydraulic piston means 14 is withdrawn, only the links B' and C' for compression are released and then folded as shown in FIGS. 9 and 10. In this condition the movable plate 8 is not withdrawn yet as shown in FIG. 10. FIG. 11 shows a condition of a nearly complete release of the toggle means.

According to the second embodiment, the structure of the links for compression is separated from that of the links for releasing the toggle means, and the two links for compressions which have at its both side ends the semicircle concave portions are engaged with each other by way of the shaft. Therefore, in spite of the fact that the high pressure is applied to each part during the operation of the toggle means, the shearing force of the link for compression toward the shaft can be reduced greatly. This is due to the rack shape of the links for compression. Thus, the structure of the toggle means can be designed in a small scale, and the manufacuring cost can be reduced. Further, it is easy to supply the lubricating oil.

It is to be understood that the form of the present invention herein shown and described is to be taken as a preferred example of the same and that various changes in the shape, size and arrangement of parts may be resorted to without departing from the spirit of the present invention or the scope of the subjoined claims.

What is claimed is:

1. Toggle means mounted between two relatively movable members comprising supports on each of said members, cylindrical shaft engageable with each of said supports, said supports having partial circular end portions engaging the respective cylindrical shaft, each of said supports having opposed projections spaced from one another along the transverse width of the respective support, said spaced projections defining spaced, extended circular portions engageable with the respective cylindrical shaft, whereby the respective shaft is engageable by said partial circular end portion and the extended circular portions of the spaced projections of the supports, first compression links engageable with one of said shafts, second compression links engageable with the other of said shafts, a third cylindrical shaft engageable between said first and second compression links, said compression links having transverse partial circular end portions engaging the respective cylindrical shaft, each of said compression links having opposed projections spaced from one another along the transverse width of said end portions, said spaced projections defining spaced, extended circular portions engageable with the respective cylindrical shaft, whereby the respective shaft is engageable by said circular end portions and the extended circular portions of the spaced projections of the compression link, said compression links having generally flat and parallel upper and lower faces, said spaced projections on said compression links generally forming continuations of said faces, and means defining sloping surfaces disposed in the spaces between said spaced projections of said compression links, said sloping surfaces extending from said circular end portion of said compression links to the respective face of the compression links.

2. Toggle means according to claim 1, wherein said sloping surfaces are disposed at an acute angle relative to the respective face of said compression link.

3. Toggle means according to claim 1, wherein said transverse partial circular end portion extends longitudinally across the transverse width of said compression link.

4. Toggle means according to claim 1 further comprising plate members extending between and mounted on said support members and the respective cylindrical shaft for supporting the latter.

5. Toggle members according to claim 4, wherein said plate members are mounted on the longitudinal ends of said cylindrical shafts.

6. Toggle means according to claim 4 further comprising plate members extending between and mounted on at least one of said compression links and the respective cylindrical shaft.

* * * * *